April 20, 1937.　　　　　G. LARSEN　　　　　2,078,083
FOUNTAIN PEN BARREL
Filed April 5, 1935
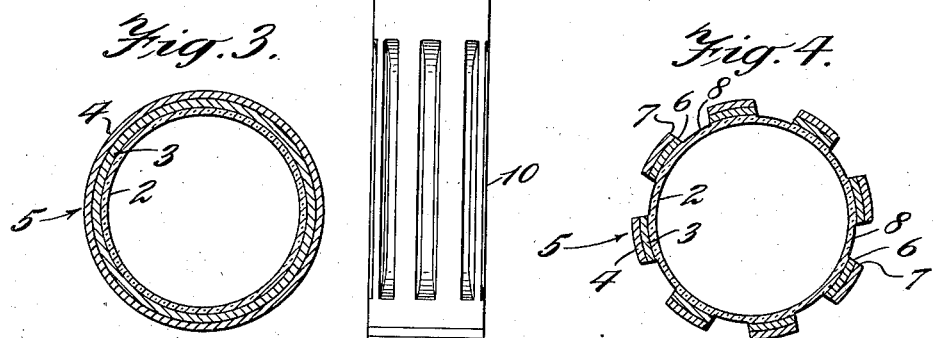
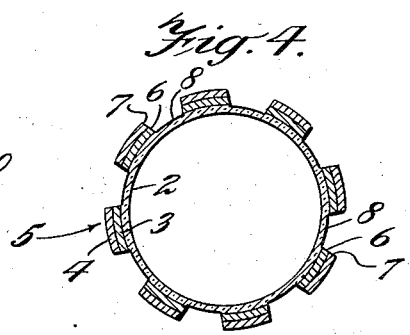
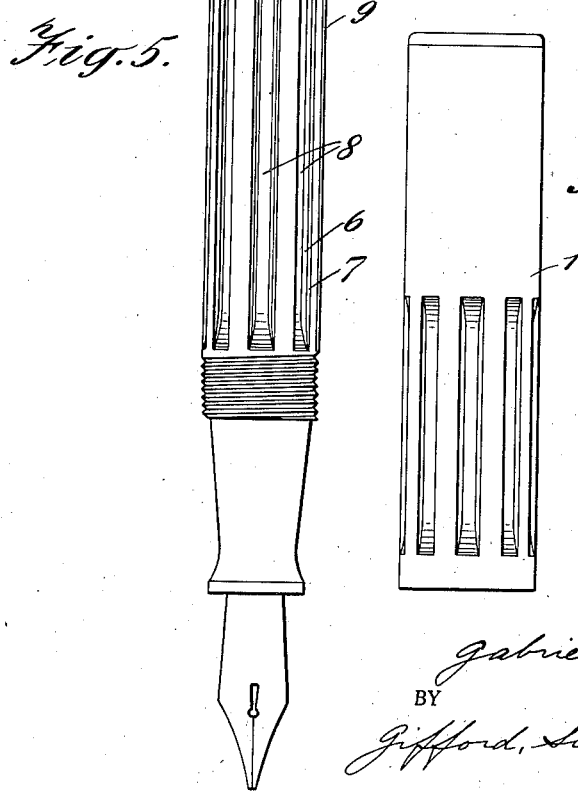
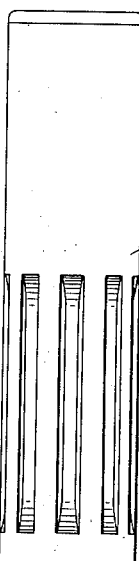
INVENTOR.
Gabriel Larsen
BY
Gifford, Scull & Burgess.
ATTORNEYS.

Patented Apr. 20, 1937

2,078,083

UNITED STATES PATENT OFFICE 2,078,083

FOUNTAIN PEN BARREL

Gabriel Larsen, Springfield, N. J., assignor to L. E. Waterman Company, New York, N. Y., a corporation of New York Application April 5, 1935, Serial No. 14,778

2 Claims. (Cl. 120—42)

This invention relates to a novel and improved form of sheet which may conveniently be used in manufacturing a fountain pen barrel. In the accompanying drawing, I have shown a fountain pen barrel and a way in which material may be treated to make the barrel. In the drawing:

Fig. 1 is a sectional view through the composite sheet used in making the illustrated barrel;

Fig. 2 is a view similar to Fig. 1, showing another form of sheet which may be employed if desirable;

Fig. 3 is a cross-sectional view through a tube formed from the material of Fig. 1;

Fig. 4 is a view similar to Fig. 3 but showing the tube following the succeeding step in the method;

Fig. 5 is a longitudinal view of a fountain pen barrel which may be manufactured from the tube of Fig. 3;

Fig. 6 is a view of a cap which may likewise be made according to this invention and which may accompany the pen of Fig. 5.

For the sake of illustration, I shall assume that the invention is to be practiced in connection with the manufacture of a fountain pen barrel, although it is to be understood that that article is only one which may be made by the invention. I shall also assume that the material used is cellulosic in character, as that material is one which lends itself to the practice of the invention, although other suitable materials may be used.

Referring to Fig. 1, I have shown therein a portion of a composite sheet 1 formed of three layers, 2, 3, and 4, which I shall assume are made of cellulosic material. In Fig. 2 I have shown a similar sheet 1' having only the layers 2 and 3 corresponding to the layers 2 and 3 of Fig. 1, merely to indicate that the number of layers is a matter largely of choice and dependent somewhat upon the requirements of the article to be formed from the sheet.

The layers may be placed with their flat faces in close contact with each other and united to form an integral composite sheet. This may be done by any well-known means. For example, in the art of manufacturing cellulosic materials, it is well-known to unite layers of such material by the use of acetone as a cement, usually combined with pressure. If other materials having different characteristics are used, another method of forming the integral composite sheet may be employed.

According to the illustrated embodiment, I then form the composite sheet of Fig. 1 into a tube 5, the cross-section of which is shown in Fig. 3. Here again the tube may be formed in any well-known manner, for example by cutting the composite sheet into a strip, winding that strip spirally around a mandrel, and cementing together the adjoining edges of the strip. This method is well-known in the art of forming tubing from cellulosic materials, and is mentioned only as one well-known method of forming a tube of such materials.

After the tube 5 is formed, it may then be milled by a suitable milling device to form grooves therein. In the illustrated embodiment, these grooves are shown as extending lengthwise of the tube and as being of such a depth as to cut entirely through the layers 3 and 4 but not through the layer 2. This results in exposing the edges 6 and 7 of the layers 3 and 4 at the grooves, and the extent of such exposure may be increased by beveling the grooves outwardly from the bottom thereof so as to increase the area of the edges 6 and 7. Where the tube is to be used for a fountain pen barrel, of course, the continuity of the tube must be preserved at all sections of the tube, and I prefer to make the groove of such depth that at least one layer is not materially cut into by the milling operation.

The result is a novel article which lends itself nicely to decorative effects. For example, if the three layers 2, 3, and 4 are made of different colors, then the edges 6 and 7 form slender bands of contrasting colors extending lengthwise of the tube, and the bottom 8 of each groove likewise forms a band of a different color. In the particular form shown, the last-named band is somewhat wider than the bands formed by the exposed edges 6 and 7.

Another possibility of the invention is that it may be used in a fountain pen barrel where a translucent or semi-translucent barrel is wanted. For example, the inner layer 2 of the tube may be translucent or transparent, and the layers 3 and 4 may be opaque or semi-opaque. Therefore the bottoms 8 of the various grooves may serve as translucent windows through which the level of ink in the barrel may be seen if desired, whereas the uncut portions of the layers 3 and 4 form a decorative effect.

If desired, the fountain pen shown in Fig. 5 may be made in two sections 9 and 10 with a cap 11. The section 9 may be made as described above, whereas, if desired, the section 10 and also the cap 11 may be made of the composite sheet 1 or of the composite sheet 1' shown in Fig. 2. In either case the layer 2 may be made non-translucent, since there is no reason for desiring windows therein to observe the level of ink. In this connection it will be understood that the section 10 of the pen may provide a pumping chamber therein into which the level of ink normally does not rise.

It will be seen that I have provided a product which is novel and which offers a wide field for decorative effects. The layers, if of cellulosic material, for example, may be made in a wide variety of colors and designs, and by varying those colors and the depth and bevel of the grooves and the number of layers, an infinite number of pleasing effects may be achieved. In addition, as pointed out above, the translucency of the product may be varied easily.

While I have shown the product in certain specific forms and as being made by certain specific steps, it is to be understood that the invention is not limited thereto, as it may be varied, within the scope of the appended claims.

I claim:
1. A fountain pen barrel formed of a plurality of layers of sheet material with the innermost layer translucent, said barrel having grooves formed therein and extending inwardly from the outer surface of the barrel through the layers outside of said innermost layer, but said innermost layer being continuous across the bottoms of the grooves to form translucent windows in the barrel.

2. A fountain pen barrel formed of a plurality of layers of sheet material with the innermost layer translucent, said barrel having a plurality of longitudinal grooves formed therein and extending inwardly from the outer surface of the barrel through the layers outside of said innermost layer, but said innermost layer being continuous across the bottoms of the grooves to form translucent windows in the barrel.

GABRIEL LARSEN.